United States Patent
Vesamäki

(10) Patent No.: US 8,121,659 B2
(45) Date of Patent: Feb. 21, 2012

(54) SLIDE MECHANISM

(75) Inventor: Seppo Vesamäki, Kangasala (FI)

(73) Assignee: Nokia Corporation, Espoo (FI)

( * ) Notice: Subject to any disclaimer, the term of this patent is extended or adjusted under 35 U.S.C. 154(b) by 963 days.

(21) Appl. No.: 12/005,039

(22) Filed: Dec. 20, 2007

(65) Prior Publication Data
US 2009/0163258 A1   Jun. 25, 2009

(51) Int. Cl.
    *H04M 1/00* (2006.01)
(52) U.S. Cl. .................. 455/575.4; 455/575.1
(58) Field of Classification Search ............... 455/575.4, 455/575.1; 379/428.01, 428.02; D14/138 AD
See application file for complete search history.

(56) References Cited

U.S. PATENT DOCUMENTS

| | | | |
|---|---|---|---|
| 6,961,593 B1* | 11/2005 | Lonka et al. .................. 455/573 |
| 7,363,066 B2* | 4/2008 | Im et al. ...................... 455/575.4 |
| 7,562,973 B2* | 7/2009 | Lapstun et al. ............... 347/104 |
| 7,646,866 B2* | 1/2010 | Lin et al. ..................... 379/433.12 |
| 7,663,557 B2* | 2/2010 | Joo et al. ........................ 343/702 |
| 7,747,298 B2* | 6/2010 | Kim et al. .................... 455/575.4 |
| 7,813,776 B2* | 10/2010 | Lee et al. ..................... 455/575.4 |
| 2005/0282597 A1* | 12/2005 | Park et al. .................... 455/575.4 |
| 2006/0046796 A1* | 3/2006 | Park et al. .................... 455/575.4 |
| 2007/0032278 A1* | 2/2007 | Lee et al. ..................... 455/575.4 |
| 2007/0049075 A1 | 3/2007 | Kim et al. ....................... 439/131 |
| 2007/0065220 A1 | 3/2007 | Kemppinen .................. 400/682 |
| 2007/0155447 A1* | 7/2007 | Gordecki ..................... 455/575.4 |
| 2008/0039159 A1* | 2/2008 | Joo et al. ...................... 455/575.4 |
| 2008/0058039 A1* | 3/2008 | Lee et al. ..................... 455/575.4 |
| 2008/0064455 A1* | 3/2008 | Joo et al. ...................... 455/575.4 |
| 2008/0070650 A1* | 3/2008 | Kim et al. .................... 455/575.4 |
| 2008/0125200 A1* | 5/2008 | Park et al. .................... 455/575.4 |
| 2008/0139260 A1* | 6/2008 | Kauhaniemi et al. ....... 455/575.4 |
| 2009/0029741 A1* | 1/2009 | Satou et al. ..................... 455/566 |
| 2009/0036178 A1* | 2/2009 | Kim et al. .................... 455/575.4 |
| 2009/0209305 A1* | 8/2009 | Lee et al. ..................... 455/575.4 |
| 2009/0227300 A1* | 9/2009 | Lee et al. ..................... 455/575.4 |

FOREIGN PATENT DOCUMENTS

| | | |
|---|---|---|
| EP | 1662754 A1 | 5/2006 |
| EP | 1675359 A1 | 6/2006 |
| EP | 1783984 A1 | 5/2007 |
| EP | 1809007 A2 | 7/2007 |
| KR | 200433144 | 12/2006 |

OTHER PUBLICATIONS

English Extract Translation of Korean Utility Model Registration Publication No. 20-0433144, Publication Date: Dec. 11, 2006, 1 page.

* cited by examiner

*Primary Examiner* — Kent Chang
*Assistant Examiner* — Magdi Elhag

(57) ABSTRACT

A slide module includes a slide middle part positioned and located between a slide glide and slide base for providing relative sliding movement with respect to one another such that the slide middle part moves a first distance with respect to the slide base and the slide glide moves a second distance with respect to the slide middle part.
The slide glide may be attached to a cover part and the slide base may be attached to a base part such that the cover and base part are arranged for relative movement with respect to one another so that at least a first portion of the base part is revealed when the cover part is extended a first distance relative to the base part and the remaining portion of the base part is revealed when the cover part is extended a second distance relative to the base part.

16 Claims, 6 Drawing Sheets

SLIDE MECHANISM

FIELD OF THE INVENTION

The present invention relates generally to slideable devices and deals more particularly with slideable electronic devices and more specifically to a slide mechanism for providing relative slideable movement between a base part and a cover part of a slideable enclosure for the slideable electronic device, for example a mobile communication device.

BACKGROUND OF THE INVENTION

Portable electronic devices particularly mobile telephones and similar communication devices have rapidly expanded in use and function as users have demanded increasing functionality. It is common to see mobile communication telephones and devices that provide Global Computer Network access, messaging, personal information management, personal digital assistant functionality, music, facsimile, gaming, in addition to telephone communication. More complex keyboards have been provided to be compatible with the more complex applications that are found in such devices. Such keyboards have relatively small keys and are generally only satisfactory for operation using the "thumbs" of the user.

Attempts to provide larger keyboards and expanded keyboard functionality for example a QWERTY keyboard in such mobile communications include the use of foldable devices in which the keys of the keyboard are carried on parts of the device that in the unfolded operating position reveals the keys of the keyboard. Generally the locations of the keys are awkward and may be separated on either side of a display making usage somewhat difficult and increasing the size of the device.

What is needed is a way to provide a full function input or display area for such portable electronic devices for example mobile communication devices while maintaining the compact size of the mobile communication device.

SUMMARY OF THE INVENTION

In accordance with a broad aspect of the invention, a slide module includes a slide base positioned and located between a slide glide and slide middle part for providing relative sliding movement with respect to one another such that the slide middle part moves a first distance with respect to the slide base and the slide glide moves a second distance with respect to the slide middle part.

In a further aspect of the invention, the slide glide is attached to a cover part and the slide base is attached to a base part such that the cover and base part are arranged for relative movement with respect to one another.

WRITTEN DESCRIPTION OF EXEMPLARY EMBODIMENTS OF THE INVENTION

Figure 1A:
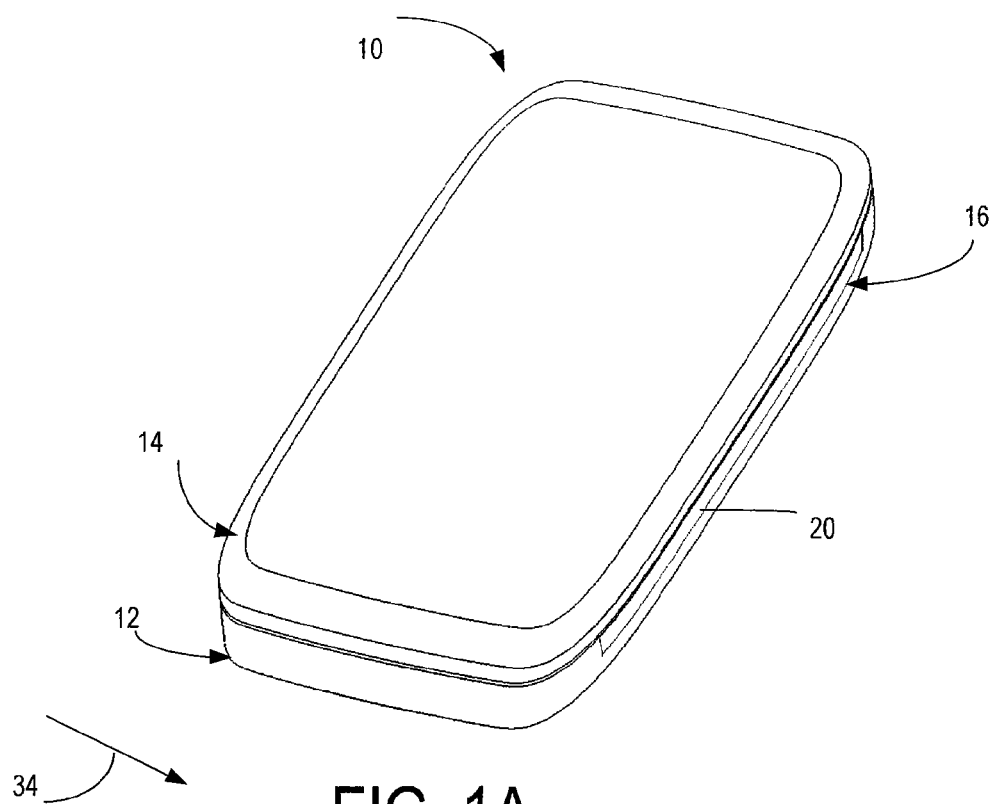
FIG. 1A is a schematic perspective view of a slideable enclosure according to some embodiments of the slide module of the present invention showing the slideable enclosure in a closed position.
Figure 1B:
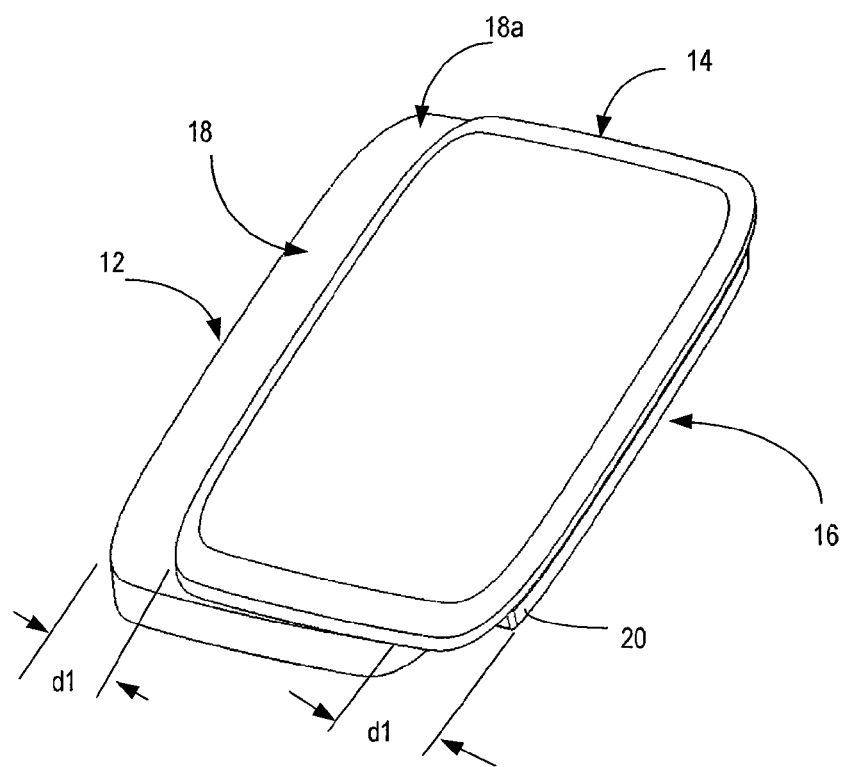
FIG. 1B is a schematic perspective view of the slideable enclosure shown in FIG. 1A showing the enclosure in an intermediate open position.

Turning now to FIG. 1A, a schematic perspective view of a slideable enclosure generally designated 10 is illustrated therein in a closed operative position and includes a base part 12 and a cover part 14. The base part 12 includes an upwardly facing surface 18 which is concealed by the cover 14 when the slideable enclosure is in its closed position as shown in FIG. 1A. A slide module according to some embodiments of the invention generally designated 16 is sandwiched between the base part 12 and the cover part 14. The slide module 16 is arranged for providing sliding relative movement between the base part 12 and the cover part 14. The slide module 16 is arranged for a two stage operation and is configured such that when the slideable enclosure 10 is opened, the action of the slide module 16 extends the cover part 14 a first predetermined distance d1 to reveal at least a first portion 18a of the first upwardly outwardly facing surface 18 of the base part 12 as illustrated for example in FIG. 1B, and a second predetermined distance d2 to additionally reveal a second portion 18b of the first upwardly outwardly facing surface 18 as illustrated for example in FIG. 1C. The arrangement of the slide module 16 with the base part 12 and the cover part 14 aims to provide maximum support between the base part 12 and the cover part 14 with minimal overlap between the base part and the cover part to maximize the upwardly facing surface area 18 available for use and access.

Figure 2:
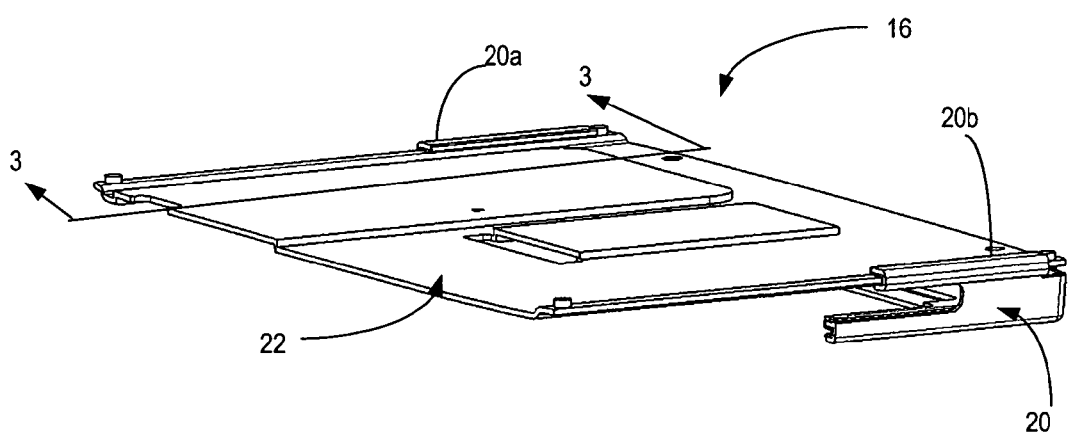
FIG. 2 is a schematic perspective view of the slide module according to some embodiments of the present invention showing the slide module in its closed position.
Figure 3:
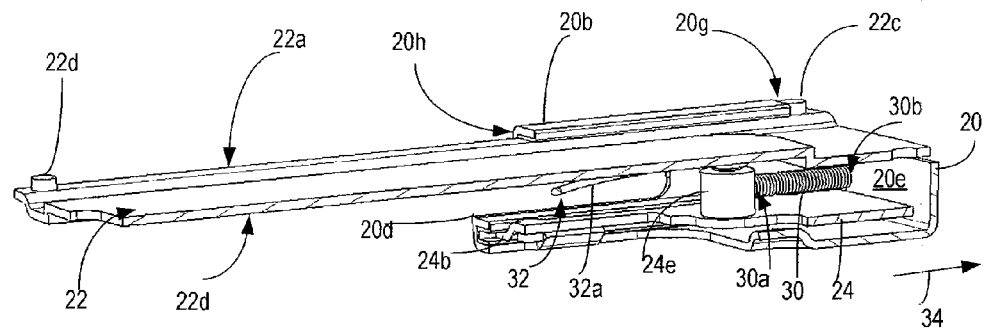
FIG. 3 is a schematic perspective cross-section view of the slide module according to some embodiments of the present invention taken along the line 3-3 of FIG. 2.
Figure 5:
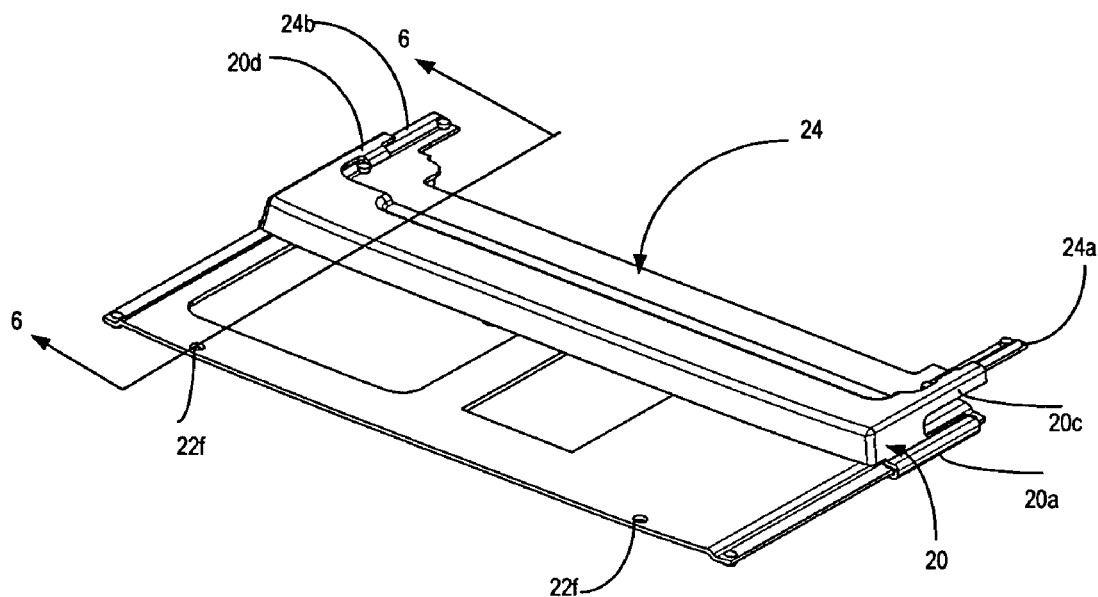
FIG. 5 is a schematic perspective view of the slide module according to some embodiments of the present invention showing the slide module in its open position as viewed from the bottom or downward facing side of the slide module.

Turning now to FIGS. 2 and 3, the slide module 16 according to some embodiments of the invention is illustrated in FIG. 2 in a schematic perspective view and shows the slide module 16 in its closed operative position. A schematic perspective cross-section view of the slide module 16 according to some embodiments of the invention is illustrated in FIG. 3 taken along the line 3-3 of FIG. 2. The slide module 16 includes a slide middle part generally designated 20 and a slide glide generally designated 22 and a slide base 24 shown best in FIG. 5. The slide glide 22 and slide middle part 20 are configured and arranged to provide relative slidable movement between one another. According to some embodiments of the invention, the slide middle part 20 is arranged with transverse oppositely disposed channels 20a, 20b suitably configured and sized for receiving in sliding engagement transverse oppositely disposed marginal edges 22a, 22b respectively of the slide glide 22.

According to some embodiments of the invention, the slide middle part 20 is arranged with transverse oppositely disposed channels 20c, 20d suitably configured and sized for receiving in sliding engagement transverse oppositely disposed marginal edges 24a, 24b respectively of the slide base 24. The channel 20a is parallel with and vertically offset from the channel 20c and the channel 20b is parallel with and vertically offset from the channel 20d such that the slide base 24 and slide glide 22 are spaced apart and move in respective planes parallel with one another. The plane of slide base 24 is positioned and located between the plane of the slide glide 22 and the plane of the slide middle part 20.

As shown in FIG. 3, according to some embodiments of the invention, at least one suitably configured operating spring generally designated 30 has one end 30a arranged for contact with the slide base 24 and an opposite end 30b arranged for contact with the inner surface end 20e of the middle slide part 20. The spring 30 is configured for providing a continuous spring load between the slide base 24 and the slide middle part 20 for biasing the middle slide part 20 in the direction of arrow 32 toward its open operative position relative to the slide base 24.

Although a compression type spring 30 is illustrated in FIG. 3 for purposes of example and explanation, the invention is not limited to a compression type spring and may be of any suitable type spring such as for example a draw type spring or a leaf type spring or any other suitably configured and arranged biasing element or device for carrying out the intended function for biasing the slide middle part 20 toward its open operative position relative to the slide base 24.

Figure 6:
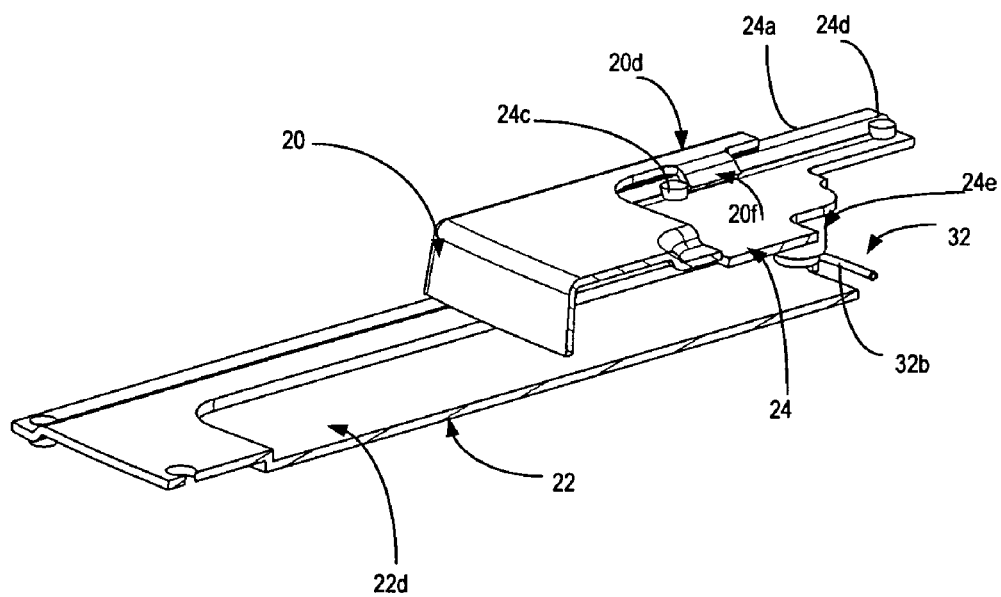
FIG. 6 is a schematic perspective cross-section view of the slide module according to some embodiments of the present invention taken along the line 6-6 of FIG. 5.

As best viewed in FIG. 6, in some embodiments of the invention the slide base 24 includes spaced apart stopper pins 24c, 24d located and arranged in the marginal edge region 24e to define the first distance d1. The stopper pins 24c, 24d co-act with a tab extending portion 20f of the channel 20d for limiting the relative sliding movement distance between the slide base 24 and the slide middle part 20. It should be recognized and appreciated that the spaced apart stopper pins may also be located in the oppositely disposed marginal edge region of the slide base 24.

Figure 4:
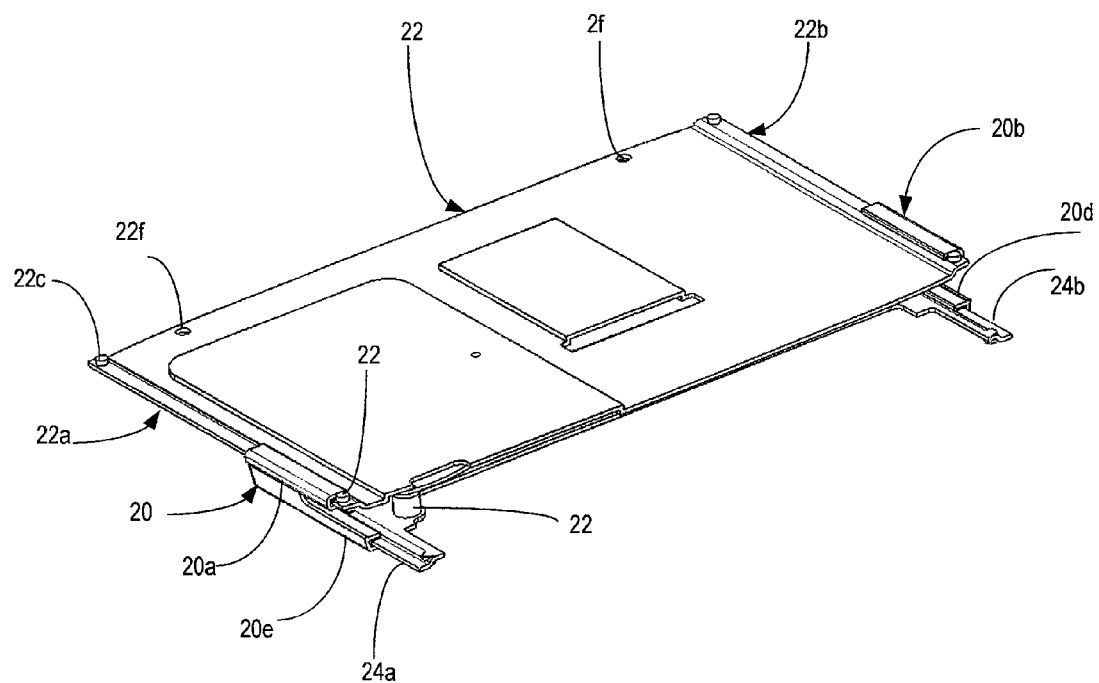
FIG. 4 is a schematic perspective view of the slide module according to some embodiments of the present invention showing the slide module in its open position.

As best viewed in FIGS. 3 and 4, in some embodiments of the invention the slide glide 22 includes spaced apart stopper pins 22c, 22d located and arranged in the marginal edge region 22a to define the second distance d2. The stopper pins 22c, 22d co-act with the respective end portions 20g, 20h of the slide middle part channel 20b for limiting the relative sliding movement distance between the slide glide 22 and the slide middle part 20. It should be recognized and appreciated the stopper pins may also be located in the oppositely disosed marginal edge region of the slide glide 22.

Although stopper pins 22c, 22d are illustrated for purposes of example and explanation in FIGS. 3 and 4, the invention is not limited to stopper pins and may be of any suitably arranged and configured stopper feature to carry out the intended function to limit the relative sliding movement distance between the slide glide 22 and the slide middle part 20. For example, the stopper feature may be fabricated as part of the slide glide 22.

As shown in FIGS. 3 and 6, at least one bi-stable operating spring generally designated 32 according to some embodiments of the invention is arranged between the slide base 24 and the slide glide 22 and configured for biasing and maintaining the slide glide 22 in an open operative position relative to the base part 24 when the bi-stable operating spring 32 is in its first operating state and in a closed operative position when the bi-stable operating spring 32 is in its second operating state relative to the base part 24. The bi-stable operating spring 32 may be suitable pivoted about a post 24e attached to the surface of the slide base 24 such that the legs 32a, 32b of the spring 32 nest and move within the recess cheek area generally designated 22d.

Figure 1C:
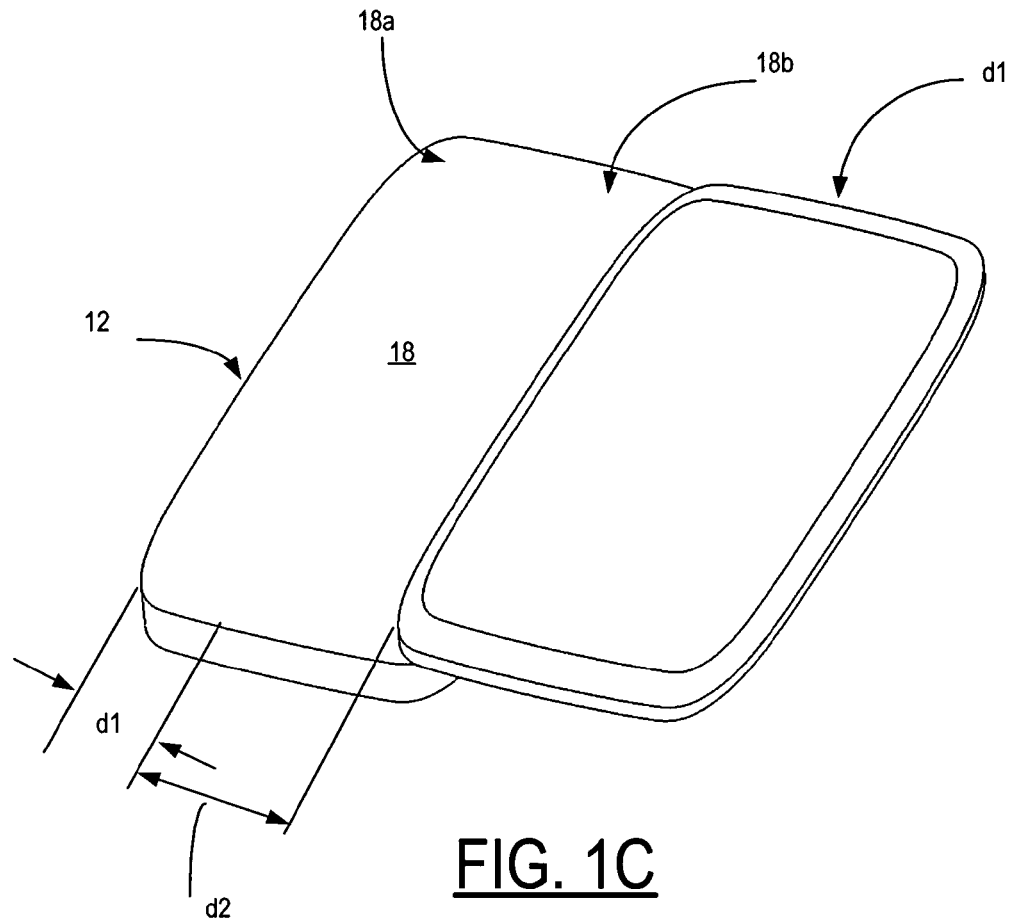
FIG. 1C is a schematic perspective view of the slideable enclosure shown in FIGS. 1A and 1B showing the enclosure in an open position.

In accordance with some embodiments of the invention, the operating sequence from a closed operative position of the slideable enclosure 10 as shown in FIG. 1A to an open position as shown in FIG. 1C starts with sliding the cover part 14 in the direction indicated by the arrow 34. The middle slide part 20 follows the cover part 14 as long as movement is stopped by the stopper pins 24c, 24d in the slide base 24. After that, the cover part 14 continues movement as defined by the stopper pins 22c, 22d in the slide glide 22 to the open position as shown in FIG. 1C. Because the slide middle part 20 is under continuous spring load pushing the middle slide part 20 outwards the cover part 14 keeps the slide middle part 20 within the enclosure 20 when the slideable enclosure 10 is in its closed position. The bi-stable spring operates to keep the cover part 14 in either its closed position or its fully open position.

Although stopper pins 24c, 24d are illustrated for purposes of example and explanation in FIG. 6, the invention is not limited to stopper pins and may be of any suitably arranged and configured stopper feature to carry out the intended function to stop relative sliding movement of the of the slide middle part 20. For example the stopper feature may be fabricated as part of the slide base 24.

In accordance with some embodiments of the invention, the slide base 24 may be part of the base part 12 chassis or frame structure and molded as one physical part.

In accordance with some embodiments of the invention, the slide base 24 may be permanently attached to the base part 12 mechanical structure for example by welding, riveting, ultrasonic welding, and in other ways well known by hose skilled in the art depending on the material used in fabricating the parts.

In accordance with some embodiments of the invention, the slide base 24 may be attached to the base part 12 mechanical structure by screws or other attachment means known to those skilled in the art.

In accordance with some embodiments of the invention, the cover part 14 may be part of the slide glide 22 chassis or frame structure and molded as one physical part.

In accordance with some embodiments of the invention, the cover part 14 may be permanently attached to the slide glide 22 mechanical structure for example by welding, riveting, ultrasonic welding, and in other ways well known by hose skilled in the art depending on the material used in fabricating the parts.

In accordance with some embodiments of the invention, the cover part 14 may be attached to the slide glide 22 mechanical structure by screws or other attachment means known to those skilled in the art, for example, screw holes 22f, 22f through the slide glide 22.

Figure 7A:
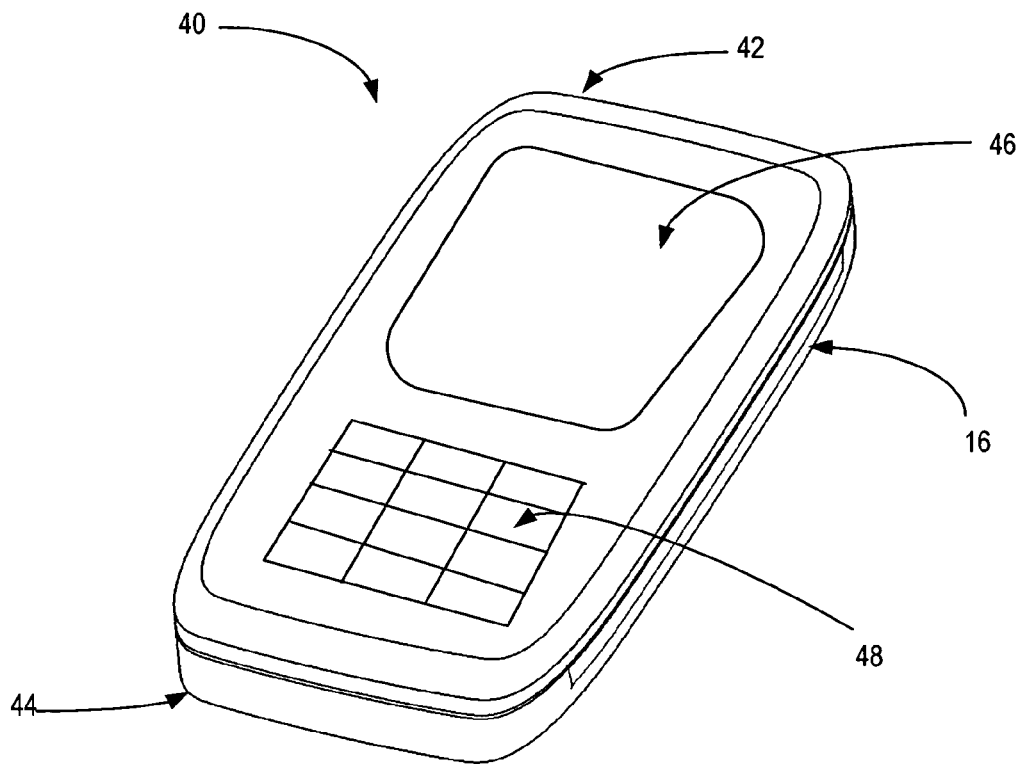
FIG. 7A is a schematic perspective view of a slideable mobile phone according to some embodiments of the slide module of the present invention showing the mobile phone in a closed operative position.
Figure 7B:
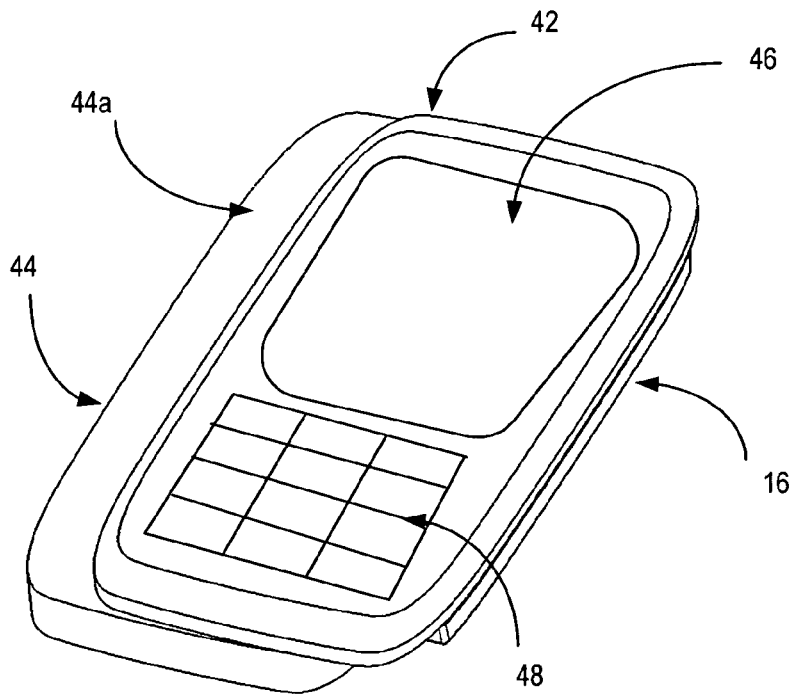
FIG. 7B is a schematic perspective view of the slideable mobile phone shown in FIG. 7A showing the mobile phone in an intermediate open position.
Figure 7C:
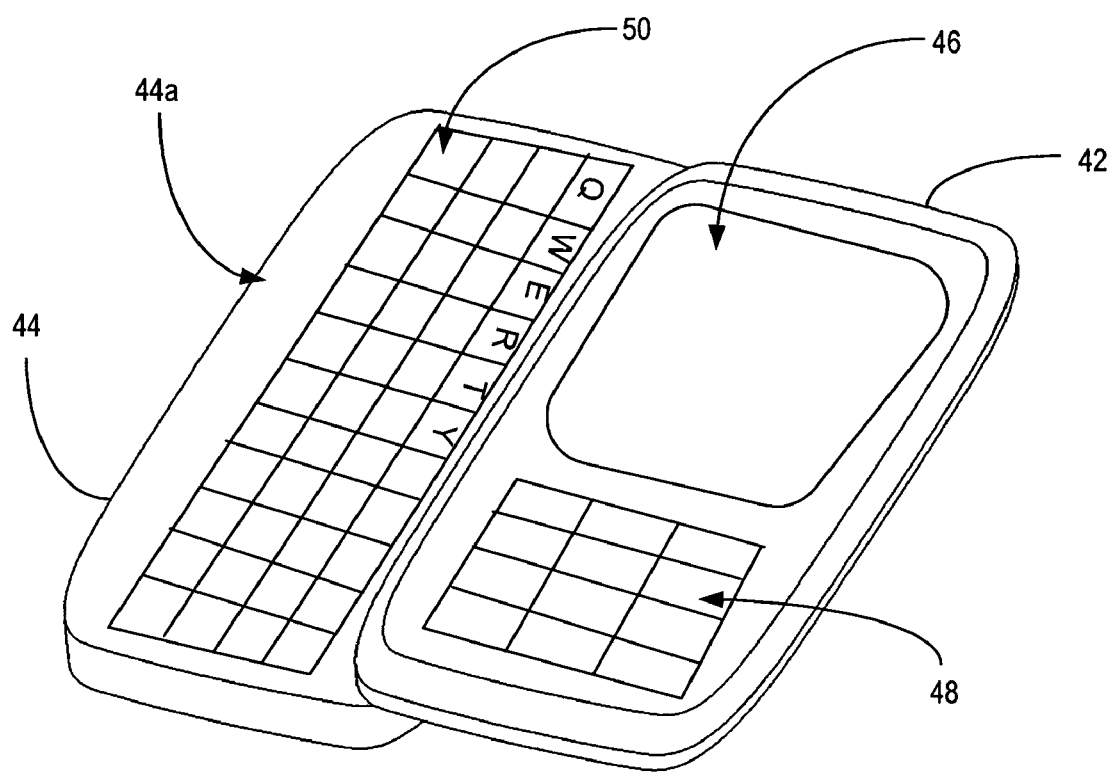
FIG. 7C is a schematic perspective view of the slideable mobile phone shown in FIGS. 7A and 7B showing the mobile phone in an open operative position.

The slide module according to some embodiments of the invention may be used with a slideable enclosure for a mobile communication device for example a mobile phone as schematically shown in FIGS. 7A-7C and generally designated 40. The mobile phone includes a cover part 42, a base part 44 and a slide module 16 sandwiched between the cover part 42 and base part 44 configured for providing slideable relative movement between the cover part and the base part in a similar manner as described above in connection with the discussion of FIGS. 1-6 above. The cover part 42 is configured and arranged with a display 46 and suitable communication keypad 48. The cover part 42 is slideable between a closed operative position as shown in FIG. 7A and an open operative position as shown in FIG. 7C to reveal a keyboard, for example a QWERTY keyboard generally designated 50 carried on the upwardly facing surface 44*a* of the base part 44. In accordance with the slide module embodying the invention, the cover part may be extended a further distance to expose more of the upwardly facing surface 44*a* to accommodate larger keys and a full function QWERTY keyboard.

In accordance with some embodiments of the invention, the upwardly facing surface 44*a* of the base part 44 may carry one or more of a suitably arranged and configured keypad, a touch pad, a display, an input area for carrying out an intended function of the portable electronic device with which the slide mechanism of the present invention may be utilized.

In accordance with some embodiments of the invention, the slide middle part and said slide base are arranged and configured in a spaced apart relationship with respect to the slide glide to accommodate the passage of at least one electrical conductor or a flexible cable between the base part and the cover part.

A mobile communication terminal, for example a mobile phone, according to some embodiments described herein for purposes of explanation of the invention are adapted for communication via a cellular network, such as the GSM 900/1800 MHz network, but could just as well be adapted for use with a Code Division Multiple Access (CDMA) network, a G3 network, or a TCP/IP-based network to cover a possible VoIP-network (e.g. via WLAN, WIMAX or similar).

The mobile communication terminal according to some embodiments described herein comprise all conventional components (internal components not shown) of a mobile phone such as a microprocessor or suitable signal processor such as a digital signal processor for controlling the operation of the mobile phone and a program memory for storing programs used by the mobile phone. Input/output circuits interface the microprocessor with the keys, the display, audio processing circuits, receiver, and transmitter. The audio processing circuits provide basic analog audio outputs to the speaker and accept analog audio inputs from the microphone. A conventional signal combiner permits two-way, fully duplex communication over a common internal antenna. The processor forms the interface to the peripheral units of the apparatus, including a RAM memory and a Flash ROM memory, a SIM card and the keys, multi-way pads and joysticks, as well as data, power supply (rechargeable battery), etc. As these components are well known, they are neither further described in detail nor illustrated in the drawings. It will also be recognized that the invention may be equally applied to portable electronic devices or handheld devices other than mobile communication terminals.

The invention claimed:

1. A device, comprising:
   a base part;
   a cover; and
   a slide module sandwiched between said base part and said cover part and arranged to provide a two stage sliding relative movement between said base part and said cover part, said slide module configured to slidingly move with said cover part with respect to said base part to extend said cover part a first distance from a closed position to a first open position to reveal at least a first portion of an upwardly facing surface of said base part, and to slidingly move said cover with respect to said slide module to extend said cover part a second distance from said first position to a second open position to additionally reveal a second portion of said upwardly facing surface of said base part.

2. The device according to claim 1 wherein said slide module further comprises:
   a slide glide;
   a slide base, and
   a slide middle part;
   said slide base further arranged for fixed attachment to said base part;
   said slide base and said slide middle part arranged and configured to provide relative sliding engagement with respect to one another;
   said slide middle part and said slide glide further arranged and configured to provide relative sliding engagement with respect to one another, and;
   said slide base, slide middle part and slide glide further being arranged and configured such that said slide middle part is positioned and located between said slide glide and said slide base.

3. The device according to claim 2 wherein said slide middle part and said slide base are arranged and configured in a spaced apart relationship with respect to said slide glide for passage of at least one electrical conductor between said base part and said cover part.

4. The device according to claim 2 further including at least one operating spring arranged between said slide base and said middle slide part and configured to provide a continuous spring load between said slide base and said slide middle part to bias said middle slide part toward its open operative position relative to said slide base.

5. The device according to claim 2 further including at least one bi-stable operating spring arranged between said slide base and said slide glide and configured to bias and to maintain said slide glide in an open operative position relative to said base part when said at least one bi-stable operating spring is in its first operating state and in a closed operative position when said at least one bi-stable operating spring is in its second operating state relative to said base part.

6. The device according to claim 2 wherein said slide base includes spaced apart stopper pins arranged to define said first distance and configured to limit the relative sliding movement distance between said slide base and said slide middle part.

7. The device according to claim 2 wherein said slide glide includes spaced apart stopper pins arranged to define said second distance and configured to limit the relative sliding movement distance between said slide glide and said base part.

8. The device according to claim 1 further comprising at least one of a keypad, a touch pad, a display, an input area carried on said upwardly facing surface of said base part such that said at least one of said keypad, said touch pad, said display, said input area is concealed by said cover part when said device is in a closed position.

9. The device according to claim 8 wherein said keypad is a keyboard.

10. The device according to claim 9 wherein a first portion of said keyboard is revealed when said cover part is extended said first distance and a remaining portion of said keyboard is additionally revealed when said cover part is extended said second distance.

11. The device according to claim 1 further arranged and configured as a portable electronic device.

12. A module, comprising:
    a slide glide;
    a slide base, and a slide middle part;

said slide base and said slide middle part arranged and configured to provide relative sliding engagement with respect to one another to move said middle part together with said slide guide a first distance with respect to said slide base;

said slide middle part and said slide glide further arranged and configured to provide relative sliding engagement with respect to one another to move said slide guide independent from said middle part a second distance with respect to said slide base; and said slide base, slide middle part and slide glide further being arranged and configured such that said slide middle part is positioned and located between said slide glide and said slide base.

13. The module according to claim 12 wherein said slide base and said slide middle part are further arranged and configured to move a first predetermined distance with respect to one another, and said slide glide and said slide middle part are further arranged and configured to extend said slide glide a second predetermined distance with respect to said slide middle part.

14. A portable electronic device, comprising:

a base part;

a cover part;

a slide module sandwiched between said base part and said cover part and arranged to provide a two stage sliding relative movement between said base part and said cover part;

said slide module configured to extend said cover a first distance from a closed operative position to a first open operative position to reveal at least a first portion of an upwardly facing surface of said base part and a second distance from said first open operative position to a second open operative position to additionally reveal a second portion of said upwardly facing surface of said base part;

said slide module further comprising:

a slide glide configured to attach to said cover;

a slide base configured to attach to said base part, and a slide middle part;

said slide base and said slide middle part arranged and configured to provide relative sliding engagement with respect to one another;

said slide middle part and said slide glide further arranged and configured to provide relative sliding engagement with respect to one another, and said slide base, slide middle part and slide glide further being arranged and configured such that said slide middle part is positioned and located between said slide glide and said slide base.

15. The portable electronic device according to claim 14 wherein:

said cover is arranged with a display and a communication keypad, and said base part is arranged with a at least one of a keypad, a keyboard, a touch pad, a second display, an input area.

16. The portable electronic device according to claim 15 wherein said keyboard is a QWERTY keyboard.

* * * * *